United States Patent [19]

Kohtoh et al.

[11] Patent Number: 5,111,318

[45] Date of Patent: May 5, 1992

[54] FERROELECTRIC LIQUID CRYSTAL ELEMENT

[75] Inventors: Noriaki Kohtoh; Toyohiko Abe; Hiroyoshi Fukuro, all of Ichihara, Japan

[73] Assignee: Nissan Chemical Industries Ltd., Tokyo, Japan

[21] Appl. No.: 431,392

[22] Filed: Nov. 3, 1989

[30] Foreign Application Priority Data

Nov. 7, 1988 [JP] Japan .................. 63-280583

[51] Int. Cl.$^5$ .................. G02F 1/13; C09K 19/56
[52] U.S. Cl. ........................ 359/76; 359/78; 252/299.4
[58] Field of Search .......... 252/299.01, 299.4; 350/330, 341, 347 V; 359/75, 76, 78

[56] References Cited

U.S. PATENT DOCUMENTS

| | | | |
|---|---|---|---|
| 4,068,923 | 1/1978 | Tolda | 252/299.4 |
| 4,586,791 | 5/1986 | Isogai et al. | 252/299.4 |
| 4,879,059 | 11/1989 | Hanyu et al. | 252/299.4 |
| 4,965,017 | 10/1990 | Holmes et al. | 252/299.4 |

FOREIGN PATENT DOCUMENTS 2204708 11/1988 United Kingdom .

OTHER PUBLICATIONS

Patent Abstracts of Japan, vol. 7, No. 253 (P-235)[2398], 10th Nov. 1983; & JP-A-58 136 017 (Dainippon Tokyo K.K.) 12-08-83.
Patent Abstracts of Japan, vol. 11, No. 243 (P-603)[2690], 8th Aug. 1987; & JP-A-62 52 528 (Hitachi Ltd) 07-03-1987.
Japanese Journal of Applied Physics/Part 1: Regular Papers & Short Notes, vol. 27, No. 5, May 1988, pp. 827-829, Tokyo, JP; S. Kuniyasu et al.: "The Strength of Rubbing Worked on Polyimide Films for Aligning Nematic and Chiral Smectic Liquid Crystals: Controlling Pretilt Angles and Some Electroptic Performances of LCDs".
1985 SID International Symposium, Digest of Technical Papers, May 1985, edition 1, pp. 373-376, SID, New York, U.S.; T. Umeda et al.: "Print Head With Ferroelectric Liquid-Crystal Light-Shutter Array".
Fukuro, H. & Kobayashi, S., Molecular Crystals & Liquid Crystals, vol. 163, (1988), pp. 157-162.
Filas, R. & Patel, J., Applied Physics Letters, vol. 50, No. 20, (1987), pp. 1426-1428.

Primary Examiner—Robert L. Stoll
Assistant Examiner—Philip Tucker
Attorney, Agent, or Firm—Oblon, Spivak, McClelland, Maier & Neustadt

[57] ABSTRACT

A ferroelectric liquid crystal element comprising a pair of substrates each having a transparent electrode and an orientation controlling film formed on the electrode, and ferroelectric liquid crystal sandwiched between the substrates in contact with the film, wherein said orientation controlling film is an organic polymer film treated by rubbing treatment and capable of giving nematic liquid crystal a pretilt angle of at least 10° to the substrate surface.

1 Claim, 1 Drawing Sheet

FERROELECTRIC LIQUID CRYSTAL ELEMENT

The present invention relates to a ferroelectric liquid crystal element useful as a display element or an optical shutter. More particularly, it relates to a ferroelectric liquid crystal element free from serrated defects or domains and having excellent bistability.

Ferroelectric liquid crystal usually has a smectic phase showing natural polarization in a certain specific temperature range. Since a display element utilizing its birefringence was proposed by Clarke and Raggerwall (Japanese Unexamined Patent Publication No. 107216, 1981 and U.S. Pat. No. 4,367,924), it has been expected as a future liquid crystal element since it has excellent properties as compared with conventional nematic liquid crystal, such as a quick response property specific to the ferroelectric liquid crystal or an orientation memory property so-called bistability.

As a method for controlling the orientation of ferroelectric liquid crystal, a method of utilizing a thermal gradient, a so-called sharing method wherein the upper and lower substrates sandwiching liquid crystal are slightly displaced from each other, or an oblique vapor deposition method of an inorganic substance such as silicone oxide, may be mentioned as well as a method of rubbing an organic polymer film.

Among them, the thermal gradient method, the sharing method and the oblique vapor deposition method are useful for preparing ferroelectric liquid crystal elements for experimental purposes for in a small scale, but they are not practical for the production on an industrial scale.

Whereas, the method of rubbing an organic polymer film is a method wherein a film of an organic polymer such as polyimide, polyamide or polyvinyl alcohol is formed on a substrate, and it is rubbed with a cloth in a certain direction to orient liquid crystal molecules in one direction. This method has been widely used on an industrial scale as an orientation method for nematic liquid crystal.

Accordingly, if the ferroelectric liquid crystal can also be uniformly oriented by rubbing such an organic polymer film, it will be very useful as a practical method for orientation treatment.

There have been a number of reports on an attempt to prepare ferroelectric liquid crystal elements by using conventional organic polymer films such as polyimide films and subjecting such films to rubbing treatment. However, there have been difficulties such that various defects are likely to form such as serrated defects so-called zigzag defects or fine linear defects on the oriented surface, or domain defects differing in brightness, the bistability is inadequate even a voltage is applied, or it is difficult to attain a completely light-extinguished state. These difficulties have been a serious barrier against practical applications of the ferroelectric liquid crystal.

Further, it is said that when a voltage is applied to a ferroelectric liquid crystal, the liquid crystal is inverted as shown in FIG. 1 between two states of stability (A and B in the Figure) along the side surface of a cone.

To utilize the birefringence property of such ferroelectric liquid crystal for a liquid crystal element, it is common to adopt a method wherein as shown in FIG. 2, a polarizer is aligned, for example, to B in the Figure, and it is inverted to A in the Figure by the application of a voltage, whereby a difference in brightness is created.

Accordingly, from the view point of the contrast in the brightness, it is most ideal that the angle between A and B in the Figure is 45°. However, if the liquid crystal is not stable at A or B in the Figure and returns, for example, to C or D in the Figure when the voltage is switched off, the angle to C or D in the Figure will be less than 45°, and thus the contrast will decrease.

Thus, it is desired that the angle between the two states of stability in a ferroelectric liquid crystal element, or the angle (the tilt angle) between the contact line direction of the smectic phase (the rubbing direction) and, another state of stability, is as wide as possible. The tilt angle is most idealy 22.5°. However, according to the result obtained by the present inventors, with a ferroelectric liquid crystal element prepared by rubbing a conventional organic polymer film, the tilt angle of the state of stability after switching off the voltage, is usually as small as from a few degree to 10°, and it is difficult to obtain an adequate difference in brightness when the element is practically operated.

It is an object of the present invention to solve the above-mentioned problems concerning the ferroelectric liquid crystal element and to provide a ferroelectric liquid crystal element free from defects and capable of providing a display with a high contrast in a uniform orientation state with an extremely high bistability, by means of an orientation controlling film obtained by the rubbing teatment of an organic polymer film such as a polyimide film.

The present inventors have made extensive studies to solve the above problems concerning the ferroelectric liquid crystal element, and as a result, have accomplished the present invention.

The present invention provides a ferroelectric liquid crystal element comprising a pair of sustrates each having a transparent electrode and an orientation controlling film formed on the electrode, and ferroelectric liquid crystal sandwiched between the substrates in contact with the film, wherein said orientation controlling film is an organic polymer film treated by rubbing treatment and capable of giving nematic liquid crystal a pretilt angle of at least 10° to the substrate surface.

BRIEF DESCRIPTION OF THE DRAWINGS

In the accompanying drawings.

Figure 1:
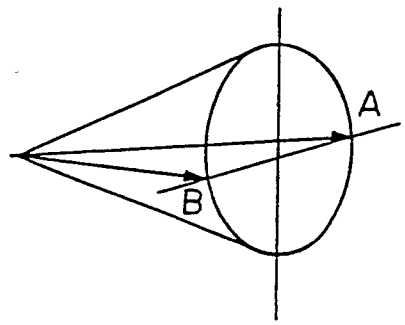
FIG. 1 is a diagrammatical view of ferroelectric liquid crystal molecules, wherein A and B indicate the longitudinal directions of the liquid crystal molecules.
Figure 2:
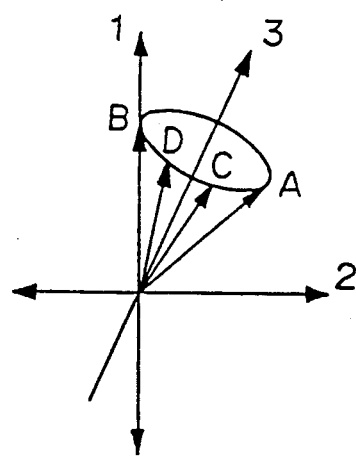
FIG. 2 is a diagrammatical illustration of the tilt angles of ferroelectric liquid crystal molecules, wherein reference numeral 1 indicates the direction of a polarizer, numeral 2 indicates the direction of a light detector, numeral 3 indicates the rubbing direction, and A to D indicate the longitudinal directions of the liquid crystal molecules.

Now, the present invention will be described in detail with referece to the preferred embodiments.

As the organic polymer film in the present invention, it is particularly preferred from the practical point of view to use a polyimide resin which is capable of orienting the nematic liquid crystal with a high pretilt angle of at least 10°.

In the present invention, the polyimide resin capable of providing a pretilt angle as high as at least 10°, may be a polyimide resin containing a long chain alkyl group as disclosed, for example, in Japanese Unexamined Patent Application No. 297819/1987 and in Japanese Patent Applications No. 4365/1988 and No. 92601/1988, or a polyimide resin as disclosed in Japanese Patent Application No. 94180/1987.

However, the organic polymer film is not limited to such particular examples and may be any polymer film so long as it is capable of providing a pretilt angle of at least 10° to achieve the object of the present invention.

By using such organic polymer films of e.g. polyimide films capable of providing a high pretilt angle, it is possible to obtain a pretilt angle of at least 10° by adopting suitable processing conditions such as rubbing conditions and isotropic conditions suitable for the respective materials.

In the present invention, defects can usually be eliminated if the pretilt angle is at least 10°. Depending upon the liquid crystal material, it is possible that a uniform orientation is obtainable at a higher pretilt angle, and accordingly, the pretilt angle is preferably from 15° to 30°.

Now, the process for the preparation of a ferroelectric liquid crystal element will be described.

A solution of a polyimide capable of providing a pretilt angle of at least 10° or polyamic acid as its precursor, is coated on the electrode surface of a pair of substrates each provided with a transparent electrode, and then heat-treated usually at a temperature of from 100° to 450° C. to form a film having a thickness of from 100 to 5000 Å, preferably from 100 to 1000 Å.

Then, the film surface is rubbed in a certain direction with a cloth or the like to obtain an orientation controlling film.

Then, the pair of substrates are bonded to each other with a spacer of from 1 to 5 μ interposed therebetween so that the film surfaces face to each other with the respective rubbing directions in parallel or perpendicular to each other. Then, ferroelectric liquid crystal is injected under heating at a temperature of at least the isotropic temperature of the liquid crystal, preferably from 80° to 140° C., followed by gradual cooling to room temperature, to obtain a ferroelectric liquid crystal element of the present invention. Thus, by the organic polymer film capable of providing a high pretilt angle of at least 10° C., it is possible to obtain a ferroelectric liquid crystal element having a uniform orientation and capable of exhibiting adequate bistability.

Specific examples of the ferroelectric liquid crystal which may be used in the present invention include, for example, p-dexyloxybenzylidene-p'-amino-2-methylbutyl cinnamate (DOBAMBC), p-hexyloxybenzylidine-p'-amino-2-chloropropyl cinnamate (HOBACPC), p-decyloxybenzylidene-p'-amino-2-methylbutyl-p-cyano cinnamate (DOBAMBCC), p-tetradexyloxybenzylidene-p'-amino-2-methylbutyl-α-cyano cinnamate (TDOBAMBCC), p-octyloxybenzylidene-p'-amino-2-methylbutyl-p-chloro cinnamate (OOBAMBCC), p-octyloxybenzylidene-p'-amino-2-methylbutyl-α-methyl cinnamate, 4, 4'-azoxycinnamamic acid-bis (2-methylbutyl) ester, 4-o-(2-methyl)butyl resorcylidene-4'-octylaniline, 4-(2'-methylbutyl)phenyl-4'-octyloxybiphenyl-4-carboxylate, 4-hexyloxyphenyl-4-(2''-methylbutyl)biphenyl-4'-carboxylate, 4-octyloxyphenyl-4-(2''-methylbutyl)biphenyl-4'-carboxylate, 4-heptylphenyl-4-(4''-methylhexyl)biphenyl-4'-carboxylate, and 4-(2''-methylbutyl)phenyl-4-(4''-methylhexyl)-biphenyl-4'-carboxylate. These materials may be used alone or in combination as a mixture of two or more different types.

Further, in the present invention, a chiral smectic C phase (Smc*), a H phase (SmH*), an I phase (SmI*), a K phase (SmK*) or a G phase (SmG*) can be used as the ferroelectric liquid crystal.

The reason why it is possible to obtain a ferroelectric liquid crystal element having a uniform orientation and excellent bistability by the organic polymer film capable of providing a high pretilt angle of at least 10°, is not clearly understood. However, in general, an organic polymer film capable of providing a pretilt angle has a low polarity of the film represented by e.g. the surface tension, and no excessive binding force of the substrate surface will be given to the ferroelectric liquid crystal. This is considered to be one of the factors which give rise to the effects of the present invention.

Namely, according to the present invention, disappearance of defects such as domains is observed by the high pretilt angle, and excellent bistability is obtainable by the application of a voltage, irrestective of whether the rubbing directions or the upper and lower substrates are arranged in parallel or perpendicular to each other at the time of assembling the cell.

This indicates that the effects of the present invetion cannot simply be explained only by the inclination of the smectic phase with the high pretilt angle or its uniformity, and some additional factors specific to the organic polymer film capable of providing the high pretilt angle, such as the polarity of the film, also contribute to the effects.

Now, the present invention will be described in further detail with reference to Examples. However, it should be understood that the present invention is by no means restricted by such specific Examples.

EXAMPLE 1

29.52 g (0.072 mol) of 2,2-bis[4-(4-aminophenoxy)phenyl]propane, 3.85 g (0.016 mol) of n-hexadecylamine and 15.69 g (0.08 mol) of cyclobutanetetracarboxylic acid dianhydride were reacted in 422 g of n-methyl-2-pyrrolidone, (hereinafter referred to simply as NMP) at room temperature for 4 hours to obtain a polyamic acid precursor solution.

The reduced viscosity ($\eta_{sp/c}$) of the polyamic acid precursor thus obtained was 0.52 dl/g (in a 0.5 wt % NMP solution at 30° C).

This solution was diluted to a solid content concentration of 2% by weight and then spin-coated on the electrode of a transparent electrode-coated glass substrate at 3,500 rpm, preliminarily dried at 8° C. for 5 hours and then cured at 170° C. for 60 minutes.

Then, the polyimide film surface was rubbed with a nylon cloth. Then, spacerbreads having a particle size of 2 μm were scattered on one of the film surface, and a pair of such substrates were bonded with the respective film surfaces facing to each other with the rubbing directions in parallel to each other.

Then, ferroelectric liquid crystal (CS-1014, manufactured by Tisso KK.) was injected under vaccum at 90° C. over 60 minutes, followed by heat treatment at 120° C. for 60 minutes. Then, the assembly was gradually cooled to 30° C. at a rate of 1° C./min to obtain a ferroelectric liquid crystal cell.

Further, to measure the pretilt angle by nematic liquid crystal (ZLI-2293, manufactured by Merck Company), a cell was prepared in the same manner as above except that the particle size of the spacerbeads was changed to 7 μm, and the rubbing directions were changed to perpendicular to each other.

The ferroelectric liquid crystal cell thus prepared was observed by a polarizing microscope, whereby a uniform orientation state was observed, and no serrated or linear defects, or no domains were observed.

With respect to the nematic liquid crystal cell, the pretilt angle was measured by an electrostatic capacity method and found to be as high as 19°.

Further, pulses of 20V with a pulse length of 1 msec were applied to the ferroelectric liquid crystal cell at a pulse interval of 500 msec so that positive and negative voltages were applied alternately, whereby the change in the light transmittance through the cell was measured by an oscilloscope. As a result, the light transmittance between the pulses where the voltage was OV, was maintained to be from 90 to 100% of the transmittance upon application of the voltage irrespective of whether the voltage was positive or negative, thus showing excellent bistability.

Further, after switching off the voltage, the orientation at the electrode portion was observed, whereby the true black extinguished level was observed when the cell was rotated 20° from the rubbing direction, and thus it retained substantially the same value as the tilt angle (21°) of the employed ferroelectric liquid crystal itself.

EXAMPLE 2

4.82 g (0.02 mol) of n-hexadecylamine was added to 150 ml of NMP, and the mixture was stirred to obtain a uniform solution. Then, 1.96 g (0.01 mol) of 1,2,3,4-cyclobutadiene tetracarboxylic acid dianhydride was added thereto, and the stirring was continued at 20° C. for 4 hours.

This solution was poured into a large amount of water, and precipitated white substance was collected by filtration and dried under reduced pressure at 30° C. for 8 hours to obtain a diimide compound precursor having an alkyl chain with 16 carbon atoms.

Then, 4.1 g (0.01 mol) of 2,2-bis[4-(4-aminophenoxy)phenyl]propane and 1.92 g (0.0098 mol) of cyclobutane tetracarboxylic acid dianhydride was reacted in 54.2 g of NMP at 23° C. for 4 hours to obtain a polyimide resin precursor solution. The reduced viscosity $\eta_{sp/c}$ of the polyimide resin precursor thus obtained, was 0.71 dl/g (in a 0.5 wt % NMP solution at 30° C.).

To 30 g of this polyimide resin precursor solution, 70 g of NMP was added, and 0.09 g (3% by weight relative to the polyimide resin precursor component) of the above diimide compound precursor was added. The mixture was thoroughly stirred to obtain a uniform solution. This diluted solution was spin-coated to two sheets of transparent electrode-coated glass.

Then, a ferroelectric liquid crystal cell was prepared in the same manner as in Example 1. This cell showed excellent orientation without any defects. The pretilt angle with the nematic liquid crystal cell was 15°.

EXAMPLE 3

6.481 g (12.5 m mol) of 1,1,1,3,3,3-hexafluoro-2,2-bis[4-(4-aminophenoxy)phenyl]propane, 3.106 g (12.5 mmol) of 1,3-bis(aminopropyl)-tetramethyldisiloxane and 4.903 g (25 mmol) of cyclobutane tetracarboxylic acid dianhydride were reacted in 82.11 g of NMP at room temperature for 4 hours to obtain a polyimide precursor solution having a solid content concentration of 15% by weight and a kinematic viscosity of 380 centipoise.

This solution was diluted with NMP to a solid content concentration of 3.5% by weight.

The solution was spin-coated on the electrodes of two sheets of transparent electrode-coated glass substrates at 3,500 rpm, preliminarily dried at 80° C. for 5 minutes and then cured at 250° C. for 60 minutes to form a polyimide film having a thickness of about 800 Å.

Then, a ferroelectric liquid crystal cell was prepared in the same manner as in Example 1, whereby a uniform orientation without any defects was obtained, and the cell showed high bistability. The pretilt angle with a nematic liquid crystal cell was as high as 19°.

EXAMPLE 4

A cell was prepared in the same manner as in Example 1 except that the ferroelectric liquid crystal material was changed to ZLI-3654, manufactured by Merck Company, whereby a uniform orientation without any defects was obtained, and bistability was excellent.

EXAMPLE 5

A ferroelectric liquid crystal cell was prepared in the same manner as in Example 1, except that at the time of bonding the substrates, the cell was assembled so that the rubbing directions of the upper and lower substrates were perpendicular to each other. The orientation state was observed, whereby no linear or serrated defects were observed, and bistability was excellent.

COMPARATIVE EXAMPLE 1

10.263 g (25 m mol) of 2,2-bis-[4-(4-aminophenoxy)-phenyl]propane and 4.903 g (25 m mol) of cyclobutane tetracarboxylic acid dianhydride were reacted in 85.94 g of NMP at room temperature for 4 hours to obtain a polyimide precursor solution having a solid content concentration of 15% by weight and a kinematic viscosity of 50 poise.

This solution was diluted with NMP to a solid content concetration of 3.5% by weight. Then, a ferroelectric liquid crystal cell was prepared in the same manner as in Example 1, whereby linear or domain defects formed in many cases, whereby a uniform orientation state was not obtained, and bistability was extremely low.

The pretilt angle with a menatic liquid crystal cell was as low as 3°.

COMPARATIVE EXAMPLE 2

29.52 g (0.072 mol) of 2,2-bis[4-(4-aminophenoxy)-phenyl]propane, 2.96 g (0.016 mol) of n-dodecylamine and 15.69 g (0.08 mol) of cyclobutane tetracarboxylic acid dianhydride were reacted in 433 g of NMP at room temperature for 4 hours to obtain a polyamic acid precursor solution.

The reduced viscosity $\eta_{sp/c}$ of the polyamic acid precursor thus obtained was 0.69 dl/g (in a 0.5 wt % NMP solution at 30° C.).

This solution was diluted with NMP to a total solid content of 2% by weight. Then, it was spin-coated on transparent electrode-coated glass substrates at 3500 rpm, followed by heat treatment at 170° C. for 60 minutes to obtain a polyimide resin film.

Then, a ferroelectric liquid crystal cell was prepared in the same manner as in Example 1, whereby linear or domain defects substantially formed, and a uniform orientation was not obtained.

The pretilt angle with a nematic liquid crystal cell was as low as 7°.

According to the present invention, a ferroelectric liquid crystal element having a uniform orientation without any defects and having very high bistability and capable of providing a display with a high contrast can be obtained by an orientation controlling film prepared by subjecting an organic polymer film such as a polyimide film capable of providing a pretilt angle of at least 10° to rubbing treatment.

We claim:

1. A ferroelectric liquid crystal element comprising a pair of substrates each having a transparent electrode and an orientation controlling film formed on the electrode, and ferroelectric liquid crystal sandwiched between the substrates in contact with the film, wherein said orientation controlling film is a polyimide resin film having a thickness of from 100 to 5,000 Å treated by a rubbing treatment and capable of giving nematic liquid crystal and pretilt angle of from 15 to 30° to the substrate surface and said polyimide resin has a perfluoro group and a siloxane bond, and is prepared by reacting 1,1,1,3,3,3-hexafluoro-2,2-bis (4-(4-aminophenoxy)-phenyl)propane; 1,3-bis (aminopropyl)-tetramethyl-disiloxane; and cyclobutane tetracarboxylic acid dianhydride.

* * * * *